US007382739B2

(12) United States Patent
Kramer

(10) Patent No.: US 7,382,739 B2
(45) Date of Patent: *Jun. 3, 2008

(54) METHOD AND APPARATUS FOR DISCOVERING REMOTE NODES IN AN ETHERNET PASSIVE OPTICAL NETWORK

(75) Inventor: Glen Kramer, Petaluma, CA (US)

(73) Assignee: Teknovus, Inc., Petaluma, CA (US)

(*) Notice: Subject to any disclaimer, the term of this patent is extended or adjusted under 35 U.S.C. 154(b) by 1055 days.

This patent is subject to a terminal disclaimer.

(21) Appl. No.: 10/758,895

(22) Filed: Jan. 16, 2004

(65) Prior Publication Data

US 2004/0146064 A1    Jul. 29, 2004

Related U.S. Application Data

(60) Provisional application No. 60/440,963, filed on Jan. 21, 2003.

(51) Int. Cl.
*H04L 12/28* (2006.01)

(52) U.S. Cl. .................. 370/254; 370/448; 370/458; 398/20; 398/58

(58) Field of Classification Search ................ 370/254, 370/235, 389, 448, 409, 419, 458, 421, 424, 370/542, 536, 537, 470, 473, 474; 398/20, 398/58; 455/435.1
See application file for complete search history.

(56) References Cited

U.S. PATENT DOCUMENTS

2005/0047782 A1* 3/2005 Davis et al. .................. 398/58

OTHER PUBLICATIONS

Publication: "Multi-Point MAC Control", IEEE Standard, Draft P802.3ah/D1.9, Ethernet in the First Mile, Jul. 10, 2003, pp. 435 to 517.
Publication: "Discovery Processing", IEEE Standard, Draft P802.3ah/D1.2, Ethernet in the First Mile, Dec. 2, 2002, pp. 145 to 156.

* cited by examiner

*Primary Examiner*—Chi Pham
*Assistant Examiner*—Alexander O. Boakye
(74) *Attorney, Agent, or Firm*—Park, Vaughan & Fleming LLP

(57) ABSTRACT

One embodiment of the present invention provides a system that facilitates discovery of remote nodes in EPONs. The system includes a central node and at least one remote node. During operation, the system first receives a solicitation message from the central node, wherein the solicitation message includes a time stamp indicating the solicitation message's transmission time and assigns a starting time and size for a discovery slot in which the remote node is allowed to transmit a response message to the central node for registration. The system then sets a local time at the remote node according to the received time stamp. After a random delay starting from the beginning of the assigned discovery slot, the system transmits the response message to the central node during the discovery slot with a response transmission probability that is less than or equal to one.

39 Claims, 11 Drawing Sheets

METHOD AND APPARATUS FOR DISCOVERING REMOTE NODES IN AN ETHERNET PASSIVE OPTICAL NETWORK

RELATED APPLICATION

This application hereby claims priority under 35 U.S.C. §119 to U.S. Provisional Patent Application No. 60/440,963 filed on 21 Jan. 2003, entitled "Method for Discovery Window Allocation in Ethernet Passive Optical Networks," by inventor Glen Kramer.

BACKGROUND

1. Field of the Invention

The present invention relates to the design of passive optical networks. More specifically, the present invention relates to a method and apparatus for discovering remote nodes in a passive optical network.

2. Related Art

In order to keep pace with increasing Internet traffic, optical fibers and associated optical transmission equipment have been widely deployed to substantially increase the capacity of backbone networks. However, this increase in the capacity of backbone networks has not been matched by a corresponding increase in the capacity of access networks. Even with broadband solutions, such as digital subscriber line (DSL) and cable modem (CM), the limited bandwidth offered by current access networks creates a severe bottleneck in delivering high bandwidth to end users.

Among the different technologies that are presently being developed, Ethernet passive optical networks (EPONs) are one of the best candidates for next-generation access networks. EPONs combine ubiquitous Ethernet technology with inexpensive passive optics. Hence, they offer the simplicity and scalability of Ethernet with the cost-efficiency and high capacity of passive optics. In particular, due to the high bandwidth of optical fibers, EPONs are capable of accommodating broadband voice, data, and video traffic simultaneously. Such integrated service is difficult to provide with DSL or CM technology. Furthermore, EPONs are more suitable for Internet Protocol (IP) traffic, since Ethernet frames can directly encapsulate native IP packets with different sizes, whereas ATM passive optical networks (APONs) use fixed-size ATM cells and consequently require packet fragmentation and reassembly.

Typically, EPONs are used in the "first mile" of the network, which provides connectivity between the service provider's central offices and business or residential subscribers. Logically, the first mile is a point-to-multipoint network, with a central office servicing a number of subscribers. A tree topology can be used in an EPON, wherein one fiber couples the central office to a passive optical splitter, which divides and distributes downstream optical signals to subscribers and combines upstream optical signals from subscribers (see FIG. 1).

Transmissions within an EPON are typically performed between an optical line terminal (OLT) and optical networks units (ONUs) (see FIG. 2). The OLT generally resides in the central office and couples the optical access network to a metro backbone, which is typically an external network belonging to an Internet Service Provider (ISP) or a local exchange carrier. An ONU can be located either at the curb or at an end-user location, and can provide broadband voice, data, and video services. ONUs are typically coupled to a one-by-N (1×N) passive optical coupler, where N is the number of ONUs, and the passive optical coupler is typically coupled to the OLT through a single optical link. (Note that a number of cascaded optical splitters/couplers can also be used.) This configuration can achieve significant savings in the number of fibers and amount of hardware required by EPONs.

Communications within an EPON can be divided into downstream traffic (from OLT to ONUs) and upstream traffic (from ONUs to OLT). In the downstream direction, because of the broadcast nature of the 1×N passive optical coupler, downstream data frames are broadcast by the OLT to all ONUs and are subsequently extracted by their destination ONUs. In the upstream direction, the ONUs need to share channel capacity and resources, because there is only one link coupling the passive optical coupler with the OLT.

Correspondingly, an EPON typically employs some arbitration mechanism to avoid data collision and to provide fair sharing of the upstream fiber-channel capacity. This is achieved by allocating a transmission window (timeslot) to each ONU. Each timeslot is capable of carrying several Ethernet packets. An ONU typically buffers packets it receives from a subscriber until its timeslot arrives. When its timeslot arrives, the ONU "bursts" all stored frames to the OLT at full channel speed.

To allow ONUs to join an EPON at arbitrary times, an EPON generally have two modes of operation: a discovery (initialization) mode and a normal operation mode. The discovery mode provides a time window used to detect newly joined ONUs while regular upstream data transmission is suspended. The normal operation mode accommodates regular upstream data transmissions, in which transmission opportunities are assigned in turn to all initialized ONUs. Note that an OLT regularly enters discovery mode to allow new ONUs to join the EPON.

Because more than one uninitialized ONU can request registration with the OLT and the upstream request messages from ONUs are not scheduled (because the newly joined ONUs are not initialized yet), the discovery process is subject to contention between request messages. If the contention probability is high, an EPON will need to stay in discovery mode for a longer time and may need to enter discovery mode more frequently, resulting in reduced usable bandwidth for regular data transmission.

Hence, what is needed is a method and apparatus for discovering remote nodes in an EPON, which reduces contention during the discovery process and provides more efficient bandwidth utilization.

SUMMARY

One embodiment of the present invention provides a system that facilitates discovery of remote nodes in EPONs. The system includes a central node and at least one remote node, wherein downstream data from the central node is broadcast to the remote nodes, and upstream data from each remote node is transmitted to the central node in a unicast manner. During operation, the system first receives a solicitation message from the central node, wherein the solicitation message includes a time stamp indicating the solicitation message's transmission time and assigns a starting time and size for a discovery slot in which the remote node is allowed to transmit a response to the central node for registration. The system then sets a local time at the remote node according to the received time stamp. After a random delay starting from the beginning of the assigned discovery slot, the system transmits the response message to the central node during the discovery slot with a response transmission probability that is less than or equal to one.

In a variation of this embodiment, the remote node sets the value of the response transmission probability according to how many times it has failed in registering with the central node.

In a further variation, the value of the response transmission probability is $C_f^{-(j-1)}$, where j is the number of previously failed registration attempts by the remote node; and $C_f$ is a positive number greater than 1.

In a variation of this embodiment, the central node sets the value of the response transmission probability and specifies the response transmission probability within the solicitation message.

In a further variation, the system sets the value of the response transmission probability according to the maximum number of undiscovered remote nodes that may transmit response messages for registration with the central node. Note that the maximum number of undiscovered remote nodes that may transmit response messages decreases as the number of discovered remote nodes increases in an EPON with fixed maximum number of allowable remote nodes.

In a variation of this embodiment, the system sets the size of the discovery slot according to the maximum number of undiscovered remote nodes that may transmit response messages for registration with the central node.

In a further variation, the size of the discovery slot is proportional to the maximum number of undiscovered remote nodes that may transmit response messages, and is also proportional to transmission busy time of the response message.

In a further variation, the size of the discovery slot is approximately $s = C_s \times n \times T$, where $C_s$ is a positive number; n is the maximum number of undiscovered remote nodes that may transmit response messages; and T is the transmission busy time of the response message.

In a further variation, the system stores values for the size of the discovery slot in a table based on different maximum numbers of undiscovered remote nodes that may transmit response messages. Before subsequently sending out the solicitation message, the system retrieves a value of the size of the discovery slot according to the current maximum number of undiscovered remote nodes that may transmit response messages.

In a further variation, the size of the discovery slot is approximately $$\frac{T \cdot (2n-1) + \sqrt{T^2 \cdot (2n-1)^2 + 8 \cdot T \cdot E \cdot (n-1)}}{2};$$

where T is the transmission busy time of the response message; n is the maximum number of undiscovered remote nodes that may transmit response messages; and E is the maximum round-trip propagation delay between the central node and any remote node.

In a further variation, the system stores values for the size of the discovery slot in a table based on different maximum numbers of undiscovered remote nodes that may transmit response messages. Before subsequently sending out the solicitation message, the system retrieves value of the size of the discovery slot based on the current maximum number of undiscovered remote nodes that may transmit response messages.

In a further variation, the size of the discovery slot is approximately $n \cdot T + \sqrt{n^2 \cdot T^2 + 2 \cdot T \cdot E \cdot (n-1)}$; where T is the transmission busy time of the response message; n is the maximum number of undiscovered remote nodes that may transmit response messages; and E is the maximum round-trip propagation delay between the central node and any remote node.

In a further variation, the system stores values for the size of the discovery slot in a table based on different maximum numbers of undiscovered remote nodes that may transmit response messages. Before subsequently sending out the solicitation message, the system retrieves value of the size of the response transmission period according to the current maximum number of undiscovered remote nodes that may transmit response messages

Table 1 presents an example of discovery slot size table indexed by the maximum number of undiscovered ONUs that may transmit response messages in an EPON in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

The data structures and procedures described in this detailed description are typically stored on a computer readable storage medium, which may be any device or medium that can store code and/or data for use by a computer system. This includes, but is not limited to, application specific integrated circuits (ASICs), field-programmable gate arrays (FPGAs), semiconductor memories, magnetic and optical storage devices such as disk drives, magnetic tape, CDs (compact discs) and DYDs (digital versatile discs or digital video discs).

Passive Optical Network Topology

Figure 1:
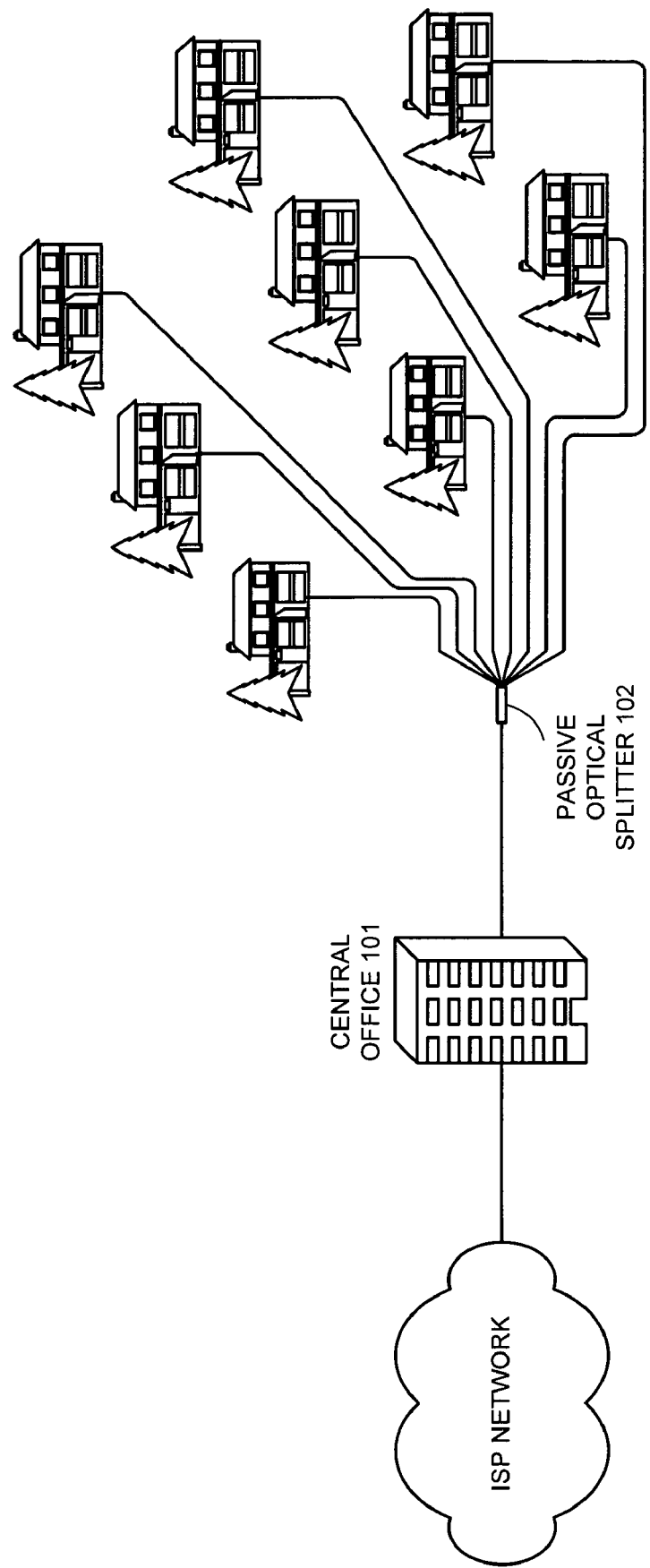
FIG. 1 illustrates a passive optical network wherein a central office and a number of subscribers are coupled through optical fibers and a passive optical splitter.

FIG. 1 illustrates a passive optical network (PON), wherein a central office and a number of subscribers are coupled together through optical fibers and a passive optical splitter. As shown in FIG. 1, a number of subscribers are coupled to a central office 101 through optical fibers and a passive optical splitter 102. Passive optical splitter 102 can be placed in the vicinity of end-user locations, so that the initial fiber deployment cost is minimized. Central office 101 can be coupled to an external network 103, such as a metropolitan area network operated by an Internet service provider (ISP). Note that although FIG. 1 illustrates a tree topology, a PON can also be based on other topologies, such as a ring or a bus.

Normal Operation Mode

Figure 2:
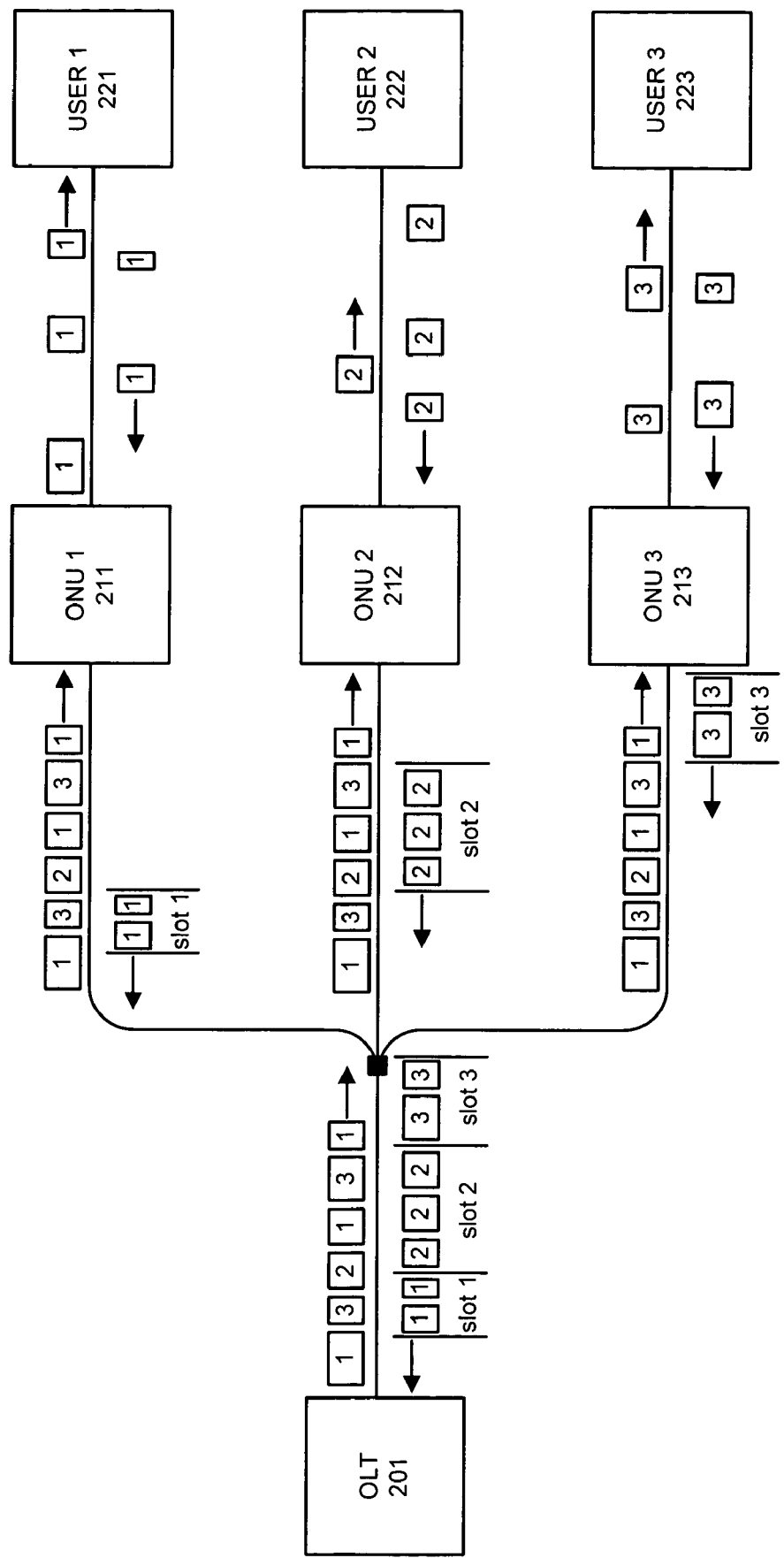
FIG. 2 illustrates an EPON in normal operation mode.

FIG. 2 illustrates an EPON in normal operation mode. To allow ONUs to join an EPON at arbitrary times, an EPON typically has two modes of operation: a normal operation mode and a discovery (initialization) mode. Normal operation mode accommodates regular upstream data transmissions, in which transmission opportunities are assigned to all initialized ONUs.

As shown in FIG. 2, in the downstream direction, OLT 201 broadcasts downstream data to ONU 1 (211), ONU 2 (212), and ONU 3 (213). While all ONUs receive the same copy of downstream data, each ONU selectively forwards only the data destined to itself to its corresponding users, which are user 1 (221), user 2 (222), and user 3 (223), respectively.

In the upstream direction, OLT 201 first schedules and assigns transmission windows to each ONU according to the ONU's service-level agreement. When not in its transmission timeslot, an ONU typically buffers the data received from its user. When its scheduled transmission timeslot arrives, an ONU transmits all the buffered user data within the assigned transmission window.

Figure 3:
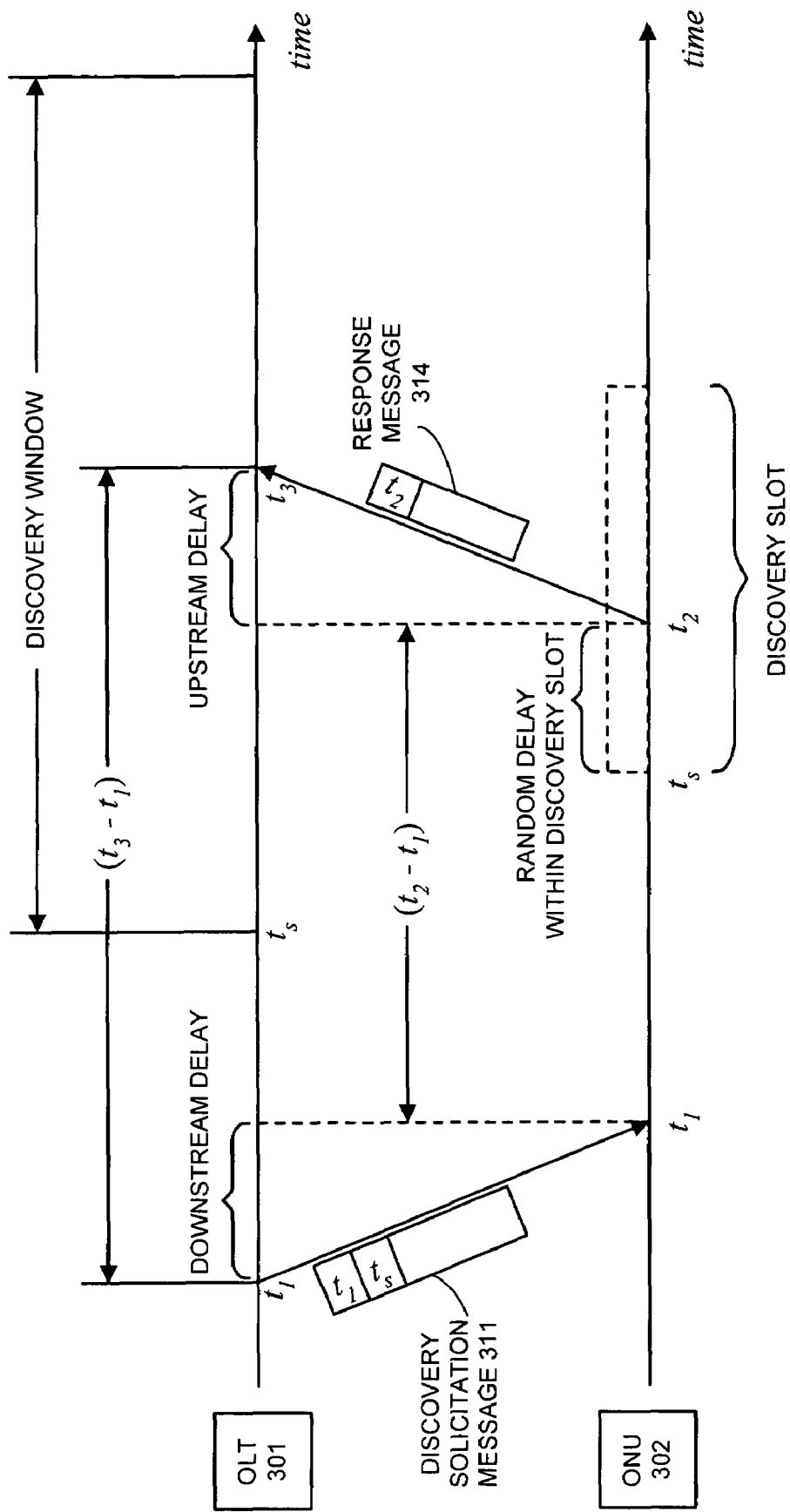
FIG. 3 presents a time-space diagram illustrating the discovery process.

Since every ONU takes turns in transmitting upstream data according to the OLT's scheduling, the upstream link's capacity can be efficiently utilized. However, for the scheduling to work properly, the OLT needs to discover and initialize a newly joined ONU. During discovery, the OLT may collect information critical to transmission scheduling, such as the ONU's round-trip propagation delay, its media access (MAC) address, its service-level agreement, etc. (Note that in some cases service-level agreement may already be known to the OLT), Discovery Mode in EPON FIG. 3 presents a time-space diagram illustrating the discovery process. At the beginning of the discovery process, OLT 301 first sets a start time $t_s$ of a time interval in which OLT 301 enters the discovery mode and allows new ONUs to register (called discovery window). Note that, from the current time till $t_s$, OLT 301 can keep receiving normal upstream data from registered ONUs. OLT 301 also sets a time interval during which each newly joined ONU is allowed to transmit a response message to OLT 301 to request registration (called discovery slot), wherein the start time of a discovery slot is the same as the start time of the discovery window, $t_s$. Since there might be more than one ONU seeking registration, and since the distance between an unregistered ONU and OLT 301 is unknown, the size of the discovery window should at least include the size of a discovery slot and the maximum allowed round-trip delay between an ONU and OLT 301.

At a time $t_1(t_1<t_s)$, OLT 301 broadcasts a discovery solicitation message 311 (which can be a DISCOVERY_G-ATE message, in accordance to the IEEE 802.3ah multipoint control protocol (MPCP) standard) to all the ONUs, including a newly joined unregistered ONU 302. Discovery solicitation message 311 includes a time stamp of $t_1$, which is the time when the message is sent by OLT 301, and a time stamp of $t_s$, which is the start time of the discovery slot. Upon receiving discovery solicitation message 311, ONU 302 sets its local clock to $t_1$ according to the time stamp carried by discovery solicitation message 311.

When ONU 302's local clock reaches $t_s$, the start time of the discovery slot, ONU 302 waits an additional random delay and then transmits a response message 314 (which can be a REGISTER_REQUEST message, in accordance to the IEEE 802.3ah MPCP standard). The random delay is applied to avoid persistent collisions when response messages from multiple uninitialized ONUs consistently collide. Response message 314 contains ONU 302's MAC address and a timestamp of $t_2$ which is ONU 302's local time when response message 314 is sent.

When OLT 301 receives response message 314 from ONU 302 at time $t_3$, it learns ONU 302's MAC address and ONU 302's local time $t_2$ when response message 314 is sent. OLT 301 can then compute the round-trip delay of ONU 302 which is $[(t_3-t_1)-(t_2-t_1)]=(t_3-t_2)$.

Figure 4:
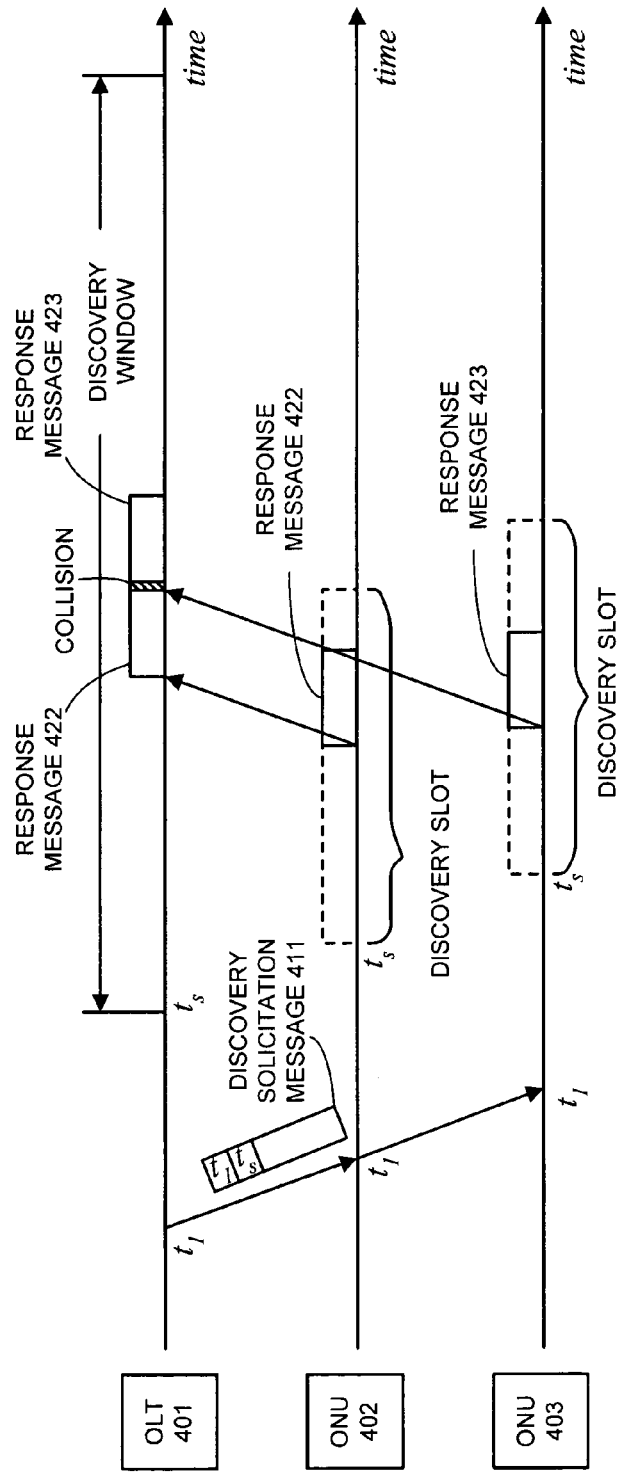
FIG. 4 presents a time-space diagram illustrating contention of response messages during a discovery process.

FIG. 4 presents a time-space diagram illustrating a collision between response messages during a discovery process. At $t_1$, OLT 401 sends out discovery solicitation message 411 with time stamp $t_1$ and discovery slot start time $t_s$. Undiscovered ONUs 402 and 403 set their local clocks to $t_1$ respectively, upon receiving discovery solicitation message 411. Because ONU 403 is located further from OLT 401 than is ONU 402, ONU 403's local clock in fact lags behind ONU 402's local clock. Nevertheless, when both ONU 402's and 403's local clocks reach $t_s$, both ONUs enter the discovery slot. ONU 402 waits for a random delay before it sends out response message 422. Similarly, ONU 403 waits for a random delay before sending out response message 423.

As shown in FIG. 4, when response messages 422 and 423 arrive at OLT 401 within one response-message length from each other, collision occurs. As a result, both response messages 422 and 423 will be garbled and neither request for registration will be successful.

Hence, one goal of this invention is to reduce the probability of collision among response messages while maintaining an efficient utilization of bandwidth.

Figure 5:
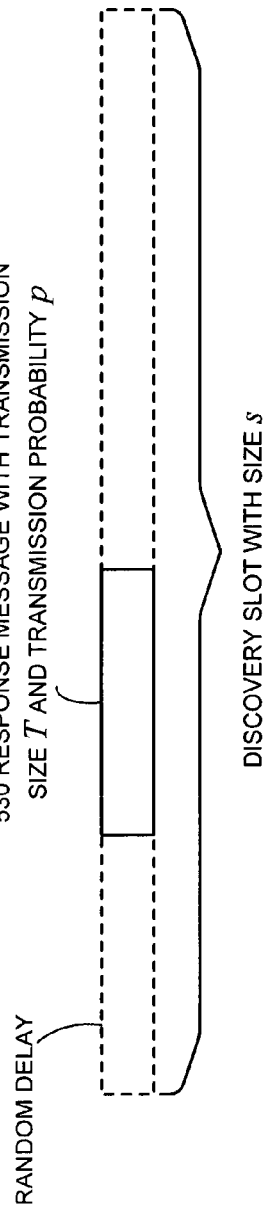
FIG. 5 illustrates transmission of a response message within a discovery slot in accordance with an embodiment of the present invention.

Reducing Collision Probability by Reducing Number of ONUs Attempting Registration FIG. 5 illustrates transmission of a response message with a probability p within a discovery slot in accordance with an embodiment of the present invention. Probability of collision of response messages is proportional to the number of undiscovered ONUs seeking registration in a given discovery window. This number, and correspondingly, the probability of collision, may be reduced if some of the contending ONUs defer their registration attempts to a future discovery window. Such deference can be achieved by applying a transmission probability $p \leq 1$ to the transmission of response message by each undiscovered ONU.

One approach to determine a reasonable value of a transmission probability p is to calculate p as a function of the number of an ONU's previously failed registration attempts. For example, one can implement an "exponential back-off" scheme, where $p=C_f^{-(j-1)}$, where $C_f$ is a positive number greater than 1, and j is the number of previously failed registration attempts.

Another approach is to allow the OLT to determine a proper value of p. Typically, an EPON has a maximum number of allowable ONUs. The OLT can calculate the maximum possible number of undiscovered ONUs based on existing registered ONUs, and can then set the value of p accordingly. The value of p can be included in the discovery solicitation message and be broadcast to the undiscovered ONUs.

Reducing Collision Probability by Properly Setting Discovery Slot Size

The probability of collision among response messages is generally inversely-proportional to the size of the discovery slot. Note that discovery slot is not the same as discovery window, as illustrated in FIG. 4. A discovery slot is a time period in which an undiscovered ONU is allowed to transmit a registration request in response to discovery solicitation message; whereas a discovery window is a time period in which the OLT enters discovery mode and is ready to receive response messages from undiscovered ONUs. Ideally, a discovery window can accommodate the maximum possible round-trip delay from an ONU to the OLT. Hence, a preferred minimum size of a discovery window is s+E, where s is the discovery slot size and E is the maximum round-trip delay from an ONU to the OLT. For example, EPON standard IEEE 802.3ah defines the maximum distance between the OLT and an ONU to be 20 km, accordingly, the maximum round-trip delay E would be 200 μs.

Since an EPON typically has a maximum number of allowable ONUs, and since the OLT can calculate the maximum number of undiscovered ONUs based on existing registered ONUs, the OLT may assign a discovery slot size as a function of the maximum number of undiscovered ONUs. For example, the OLT may set the discovery slot size to be $s=C_s \times n \times T$, where s is the discovery slot size, CS is a positive number, n is the maximum number of undiscovered ONUs, and T is the total transmission size of the response message.

It should be noted that T is not only the size of the response message body, it also includes related transmission overhead. For example, T may include laser turn-on time, synchronization sequence, frame preamble, response message body frame, inter-frame gap (guard band), and laser turn-off time. For purposes of illustration, the values of these fields are chosen as follows (the equivalent byte-sizes are calculated at 1 Gb/s bit rate):

Laser-on time=512 ns=64 bytes;
Synchronization sequence=976 ns=122 bytes;
Frame preamble=64 ns=8 bytes;
Response message body frame=512 ns=64 bytes;
Inter-frame gap=96 ns=12 bytes;
Laser-off time=512 ns=64 bytes; and therefore
T=(512+976+64+512+96+512)ns=2672 ns=334 bytes.

Although setting the discovery slot size to $s=C_s \times n \times T$ may reduce collision effectively, it might not be the most bandwidth efficient approach. To optimize the discovery slot size, it is preferable to analyze the collision probability and derive an optimized discovery slot size value correspondingly.

As illustrated in FIG. 4, a discovery window is typically larger than a discovery slot to accommodate different propagation delays from ONUs to the OLT. The worst contention scenario occurs when newly joined ONUs are of equal distance from the OLT. The result is that the discovery slots for these newly joined ONUs overlap with each other, bringing the most severe collision scenario among response messages. The probability of such worst-case collision is affected by 1) the number of contending ONUs, and 2) the size (length) of a discovery slot. As shown in FIG. 5, if a response message 530 has transmission size T, the discovery slot has size s, and if a response message is located randomly within a discovery slot, the probability of collision between two response messages given that they are transmitted within in the same (overlapping) slot is $$P_{coll} = \frac{2T}{s} - \frac{T^2}{s^2} \qquad (1)$$

When n ONUs are attempting registration, each response message might independently collide with the other (n−1) response messages. Accordingly, the probability of successful registration for each ONU is $P=(1-P_{coll})^{n-1}$, where P is the probability of successful registration for an ONU.

If $P_{coll}$ is substituted with equation (1), then $$P = (1 - P_{coll})^{n-1} = \left(1 - \frac{2T}{s} + \frac{T^2}{s^2}\right)^{n-1} = \left(1 - \frac{T}{s}\right)^{2n-2} \qquad (2)$$

Based on equation (2), the average number of successful registrations, i.e., the number of non-collided response messages, within one discovery slot, V(n, s), is $$V(n, s) = n \times P = n \times \left(1 - \frac{T}{s}\right)^{2n-2} \qquad (3)$$

Figure 6:
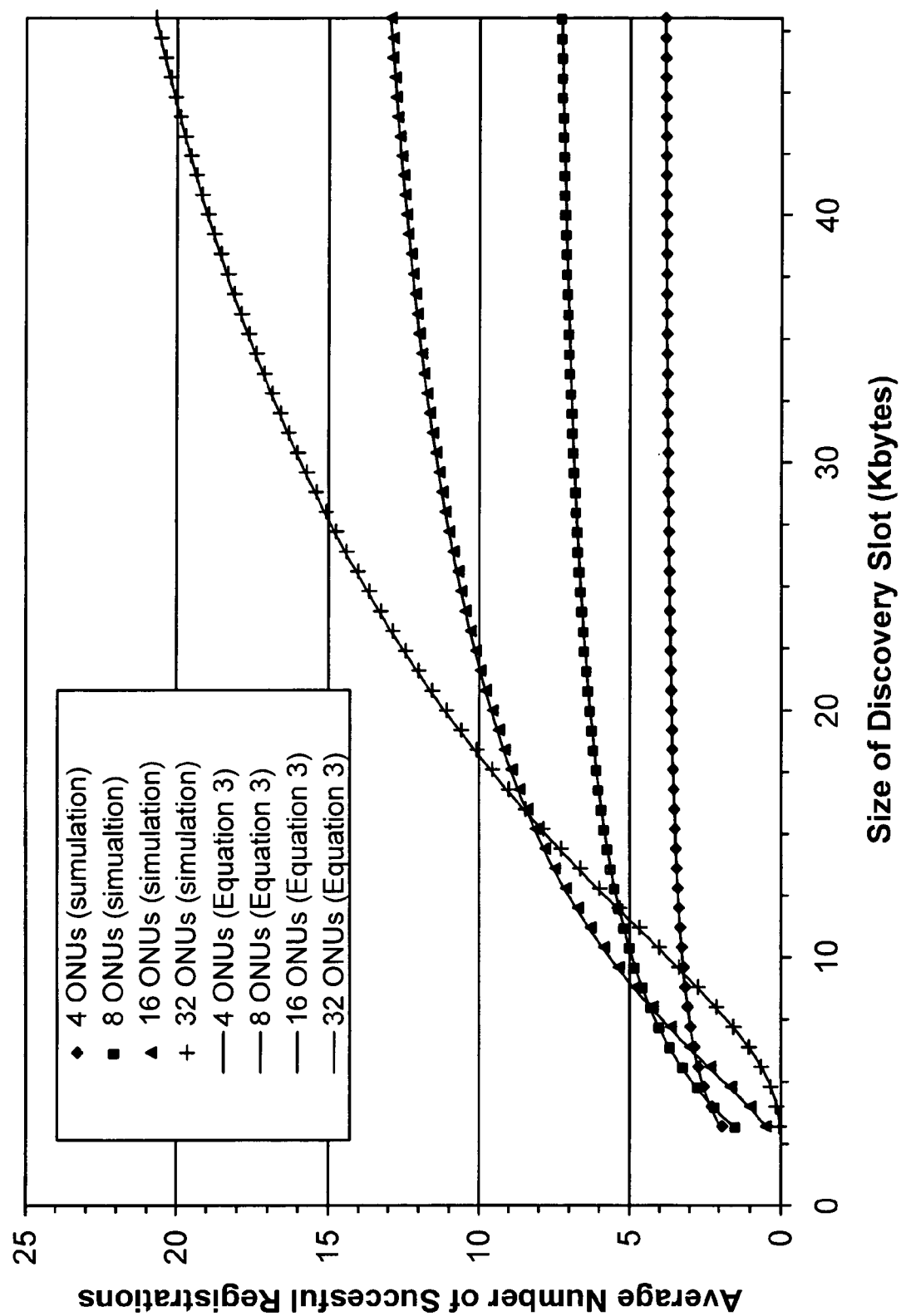
FIG. 6 presents a plot of the average number of successful registrations within one discovery slot as a function of discovery slot size in accordance with an embodiment of the present invention.

FIG. 6 presents a plot of the average number of successful registrations within one discovery slot as a function of discovery slot size measured in Kb at 1 Gb/s bit rate in accordance with an embodiment of the present invention.

The efficiency (utilization) of discovery slot can be defined as a ratio of the number of successful registrations within one discovery slot to the discovery slot size:

$$U(n, s) = \frac{V(n, s)}{s}. \qquad (4)$$

To account for the additional space needed (E) to accommodate round-trip delays in the discovery window, equation (4) can be amended as follows:

$$U(n, s) = \frac{V(n, s)}{s + E} = \frac{n}{s + E} \times \left(1 - \frac{T}{s}\right)^{2n-2} \quad (5)$$

where E is the maximum allowed round-trip delay in an EPON.

Figure 7:
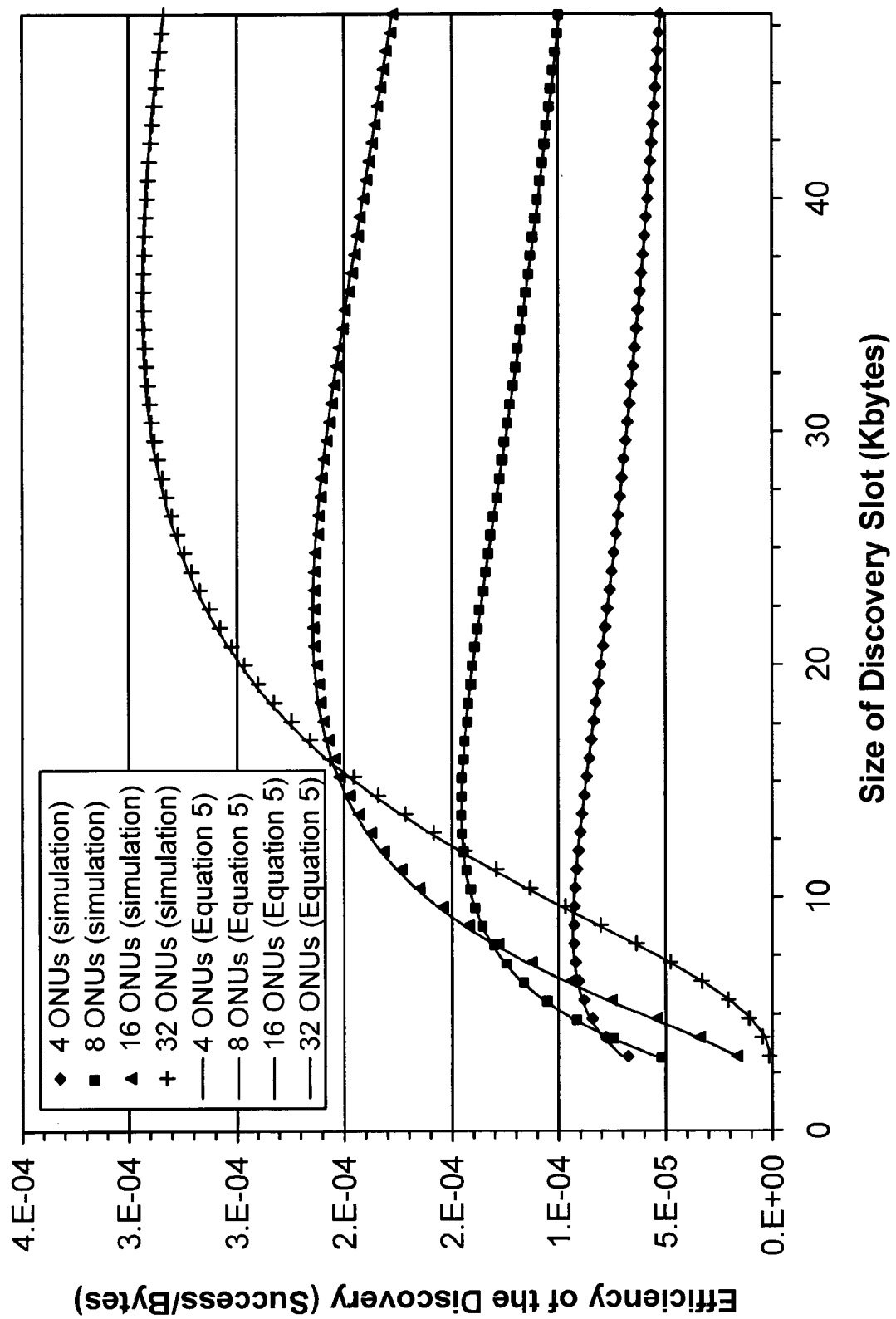
FIG. 7 presents a plot of the efficiency of discovery process as a function of discovery slot size in accordance with an embodiment of the present invention.

FIG. 7 presents a plot of the efficiency of discovery process as a function of discovery slot size measured in Kb at 1 Gb/s bit rate in accordance with an embodiment of the present invention. The value of s that corresponds to the maximum of the function in equation (5) represents the optimized discovery slot size for a given number of contending ONUs.

To compute the value of optimized discovery slot size s, one may differentiate the function in equation (5) against s, set its value to zero, and solve it for s:

$$\frac{d}{ds}\left(\frac{n}{s + E} \times \left(1 - \frac{T}{s}\right)^{2n-2}\right) = (2n - 2)T(s + E) - s^2 + Ts = 0. \quad (6)$$

The solution for equation (6) is:

$$s = \frac{T(2n-1) + \sqrt{T^2(2n-1)^2 + 8TE(n-1)}}{2} \quad (7)$$

which is the optimized discovery slot size for n contending ONUs.

Figure 8:
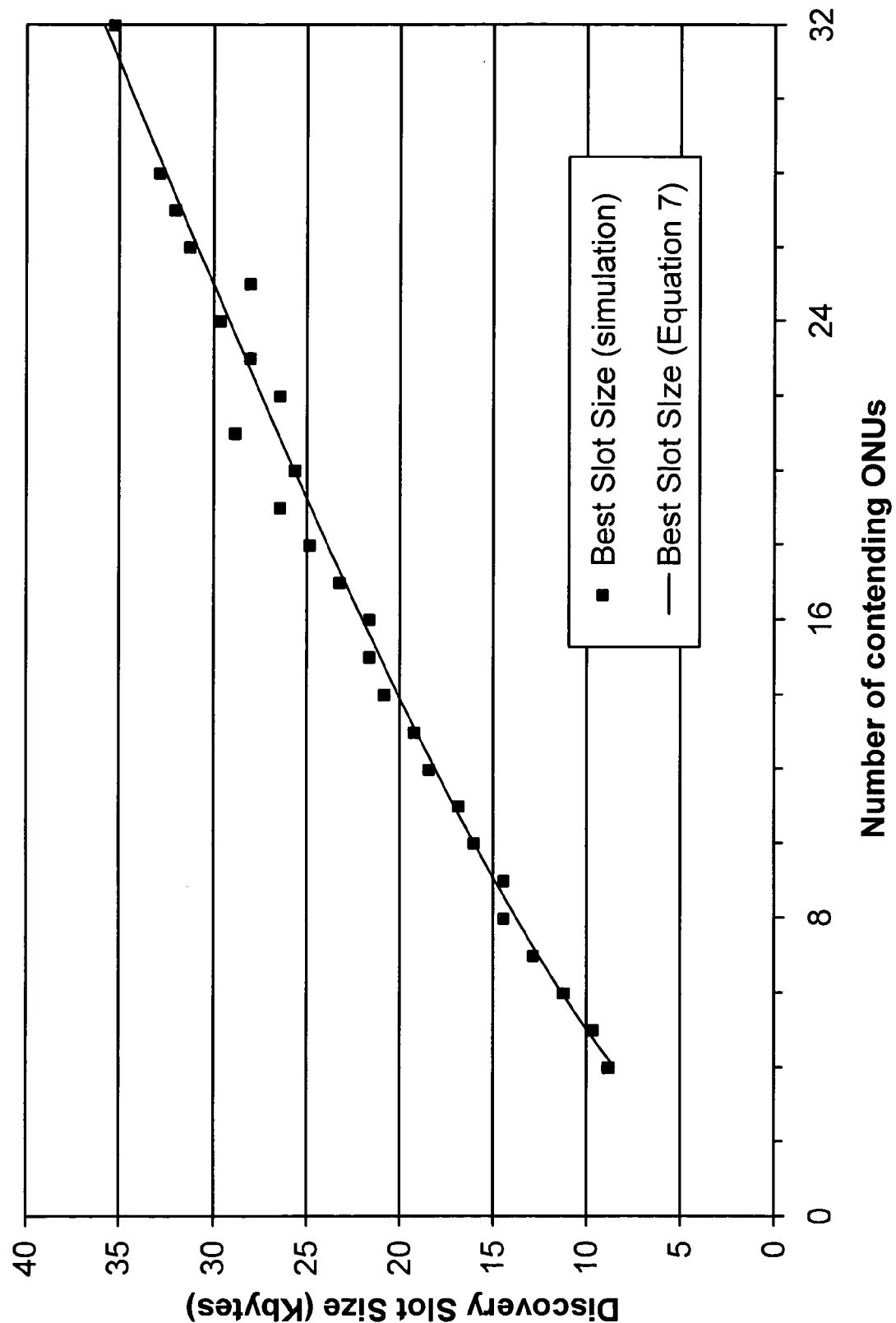
FIG. 8 presents a plot of optimized discovery slot size as a function of the number of contending ONUs in accordance with an embodiment of the present invention.

FIG. 8 presents a plot of optimized discovery slot size measured in Kbytes as a function of the number of contending ONUs in accordance with an embodiment of the present invention. The maximum round-trip delay E is chosen to be 200 μs (25,000 bytes at 1 Gb/s bit rate), in accordance to the IEEE 802.3ah MPCP standard.

Table 1 presents an example of discovery slot size table indexed by the maximum number of undiscovered ONUs that may transmit response messages in an EPON in accordance with an embodiment of the present invention. For implementation, the solution for s in equation (7) can be stored in a table according to different values of n. The OLT can retrieve an optimized s value at any time for a given n. In Table 1, the discovery slot size can also be measured in time quanta (TQ). One time quantum is 16 ns or two bytes at 1 Gb/s bit rate according to the IEEE 802.3ah standard.

Table 1 may omit the case when there is only one undiscovered ONU, because there will be no contention, and the discovery slot size s can be set to the value of the transmission size of one response message, T.

Simplification of Optimized Discovery Slot Size

Since the size of a response message is typically much smaller than the discovery slot size, the term $$\frac{T^2}{s^2}$$

in equation (1) can be considered as a negligible high-order term and therefore can be omitted. Hence, equation (1) can be approximated as:

$$P_{coll} = \frac{2T}{s}. \quad (8)$$

Accordingly, equations (2), (3), (5), (6), and (7) can be re-written respectively as follows:

$$P = (1 - P_{coll})^{n-1} = \left(1 - \frac{2T}{s}\right)^{n-1} \quad (9)$$

$$V(n, s) = n \times P = n \times \left(1 - \frac{2T}{s}\right)^{n-1} \quad (10)$$

$$U(n, s) = \frac{V(n, s)}{s + E} = \frac{n}{s + E} \times \left(1 - \frac{2T}{s}\right)^{n-1} \quad (11)$$

$$\frac{d}{ds}\left(\frac{n}{s + E} \times \left(1 - \frac{T}{s}\right)^{2n-2}\right) = (n-1)\frac{2T}{s^2} \times \frac{n}{s + E}\left(1 - \frac{2T}{s}\right)^{n-2} - \quad (12)$$

$$\frac{n}{(s + E)^2}\left(1 - \frac{2T}{s}\right)^{n-1}$$

$$= (s + E)(n - 1)2T - s^2 + 2Ts$$

$$= 0$$

$$s = nT + \sqrt{n^2T^2 + 2TE(n-1)} \quad (13)$$

Flow Charts for Possible Implementations

Figure 9:
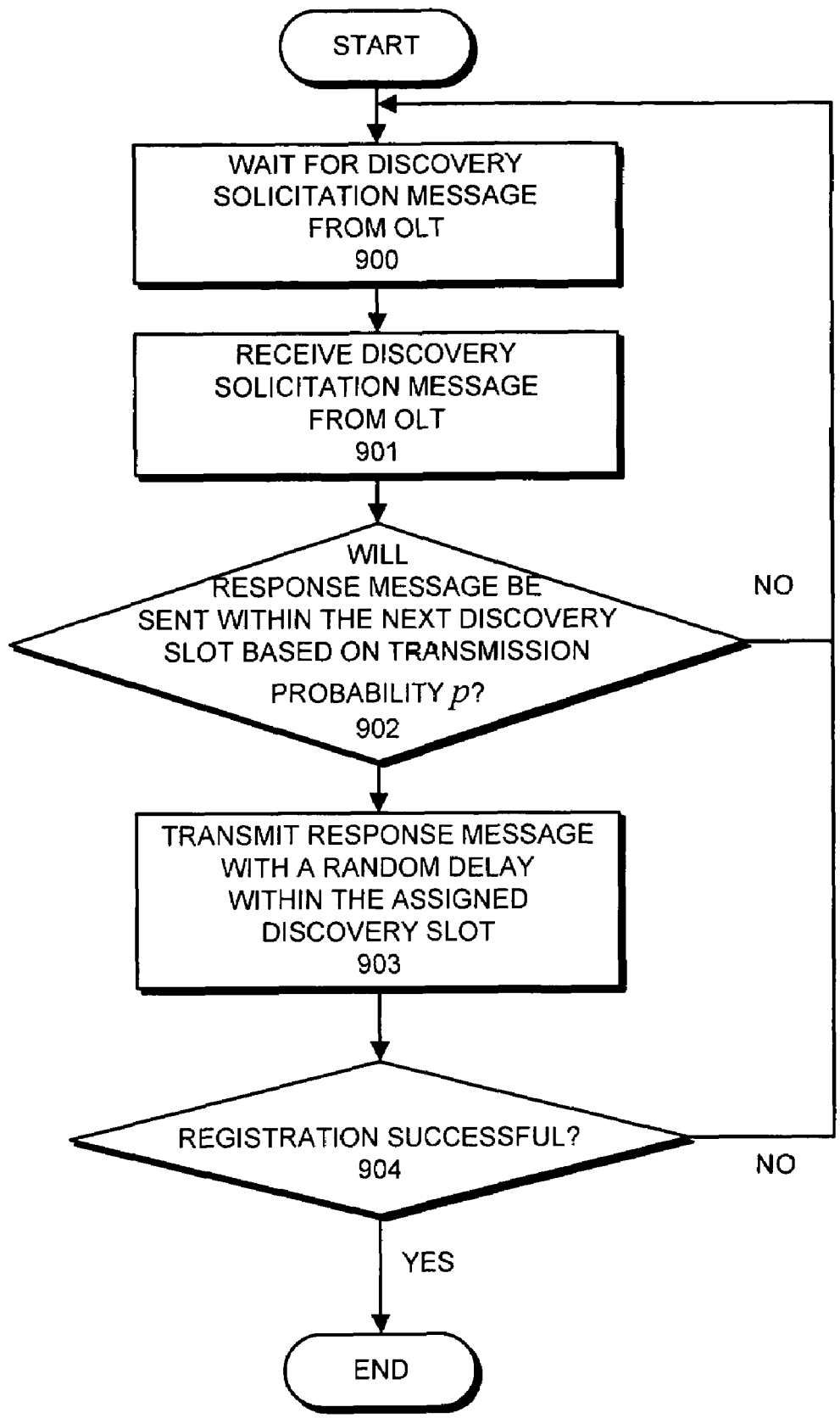
FIG. 9 presents a flow chart illustrating a discovery process wherein a report message is transmitted with probability p in a discovery slot in accordance with one embodiment of the present invention.

FIG. 9 presents a flow chart illustrating a discovery process wherein a report message is transmitted with probability p in a discovery slot in accordance with one embodiment of the present invention. The system starts by waiting for a discovery solicitation message from the OLT (step 900) and receiving a discovery solicitation message from the OLT (step 901). It then determines whether a response message should be sent to OLT based on transmission probability p during the upcoming discovery slot (step 902). If the response message will not be transmitted in the upcoming discovery slot, the system will wait for the next discovery slot and decide again (back to step 901).

If the response message is to be transmitted, the system then transmits the response message with a random delay within the assigned discovery slot (step 903). The system then finds out whether the registration process has been successful (step 904). If the registration is not successful due to collision or other reasons, the system waits for the next discovery slot (back to step 901). If the registration is successful, the discovery process ends on the ONU side and the system is ready to enter normal operation mode.

Figure 10:
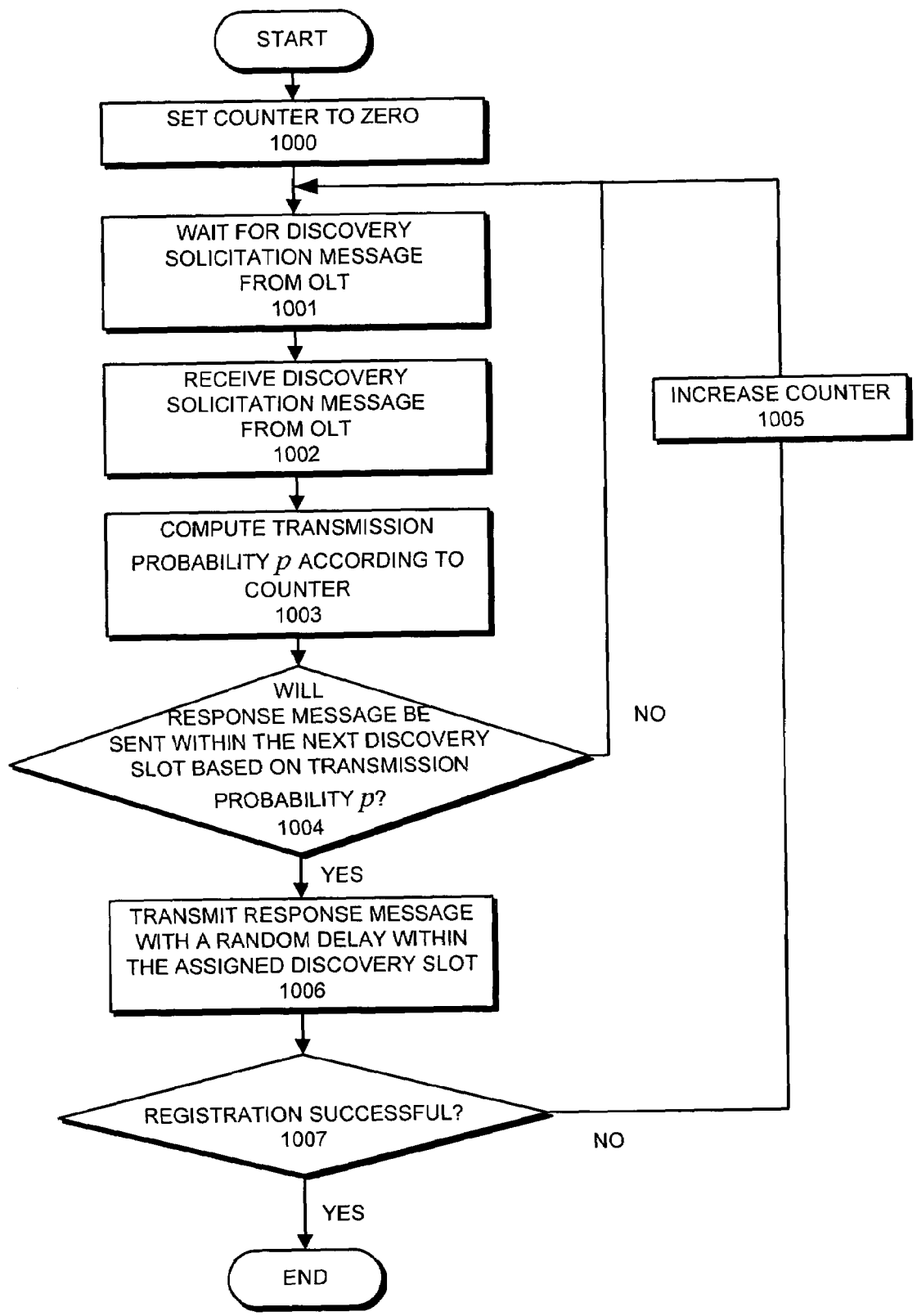
FIG. 10 presents a flow chart illustrating a discovery process wherein the report message transmission probability p is calculated according to the number of failed registrations at an ONU in accordance with one embodiment of the present invention.

FIG. 10 presents a flow chart illustrating a discovery process wherein the report message transmission probability p is calculated according to the number of previously failed registration attempts at an ONU in accordance with one embodiment of the present invention. The system starts by setting a counter to zero, which is used to record the number of previously failed registration attempts (step 1000). The system then waits for a discovery a discovery solicitation message from the OLT (step 1001). After receiving a discovery solicitation message from the OLT (step 1002), the system computes the transmission probability p according to the counter which holds the number of previously failed registration attempts (step 1003).

The system subsequently determines whether a response message should be sent to OLT based on transmission probability p during the upcoming discovery slot (step 1004). If the response message will not be sent to the OLT, the system will wait for the next discovery slot (step 1001). If the response message is to be transmitted, the system then transmits the response message with a random delay within the assigned discovery slot (step 1006). The system then finds out whether the registration process has been successful (step 1007). If the registration is not successful due to collision or other reasons, the system increases the counter by one (step 1005) and waits for the next discovery slot. If the registration is successful, the discovery process ends on the ONU side and the system is ready to enter normal operation mode.

Figure 11:
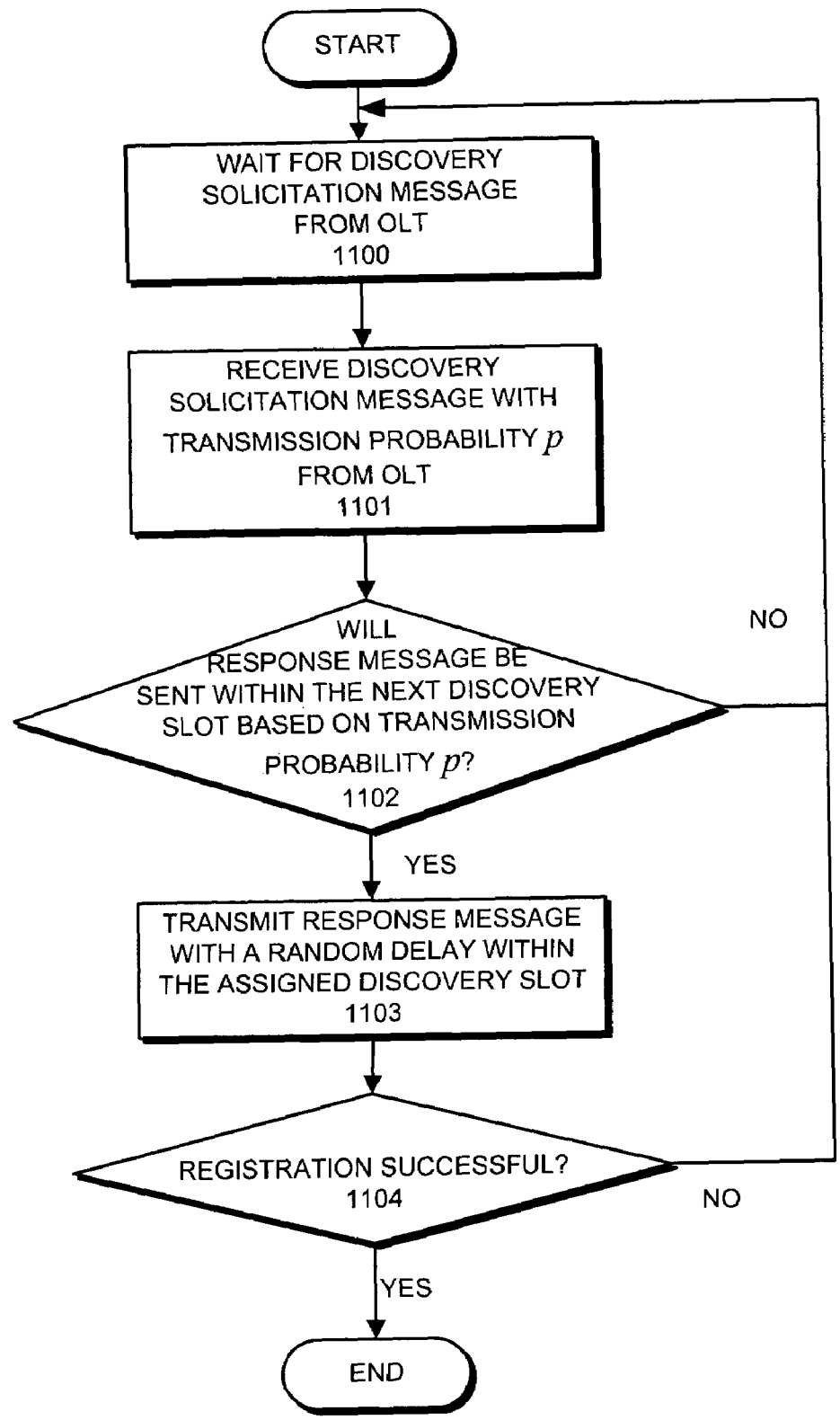
FIG. 11 presents a flow chart illustrating a discovery process wherein a report message is transmitted with probability p which is set by the OLT in accordance with one embodiment of the present invention.

FIG. 11 presents a flow chart illustrating a discovery process wherein a report message is transmitted with probability p which is set by the OLT in accordance with one embodiment of the present invention. The system starts by waiting for a discovery solicitation message from the OLT (step 1100) and receiving a discovery solicitation message which includes a transmission probability p (step 1101). It then determines whether a response message should be sent to OLT based on the received transmission probability p during the upcoming discovery slot (step 1102).

If the response message will not be transmitted in the current upcoming discovery slot, the system waits for the next discovery slot and decides again (back to step 1101). If the response message is to be transmitted, the system then transmits the response message with a random delay within the assigned discovery slot (step 1103). The system then finds out whether the registration process has been successful (step 1104). If the registration is not successful due to collision or other reasons, the system waits for the next discovery slot (back to step 1101). If the registration is successful, the discovery process ends on the ONU side and the system is ready to enter normal operation mode.

Figure 12:
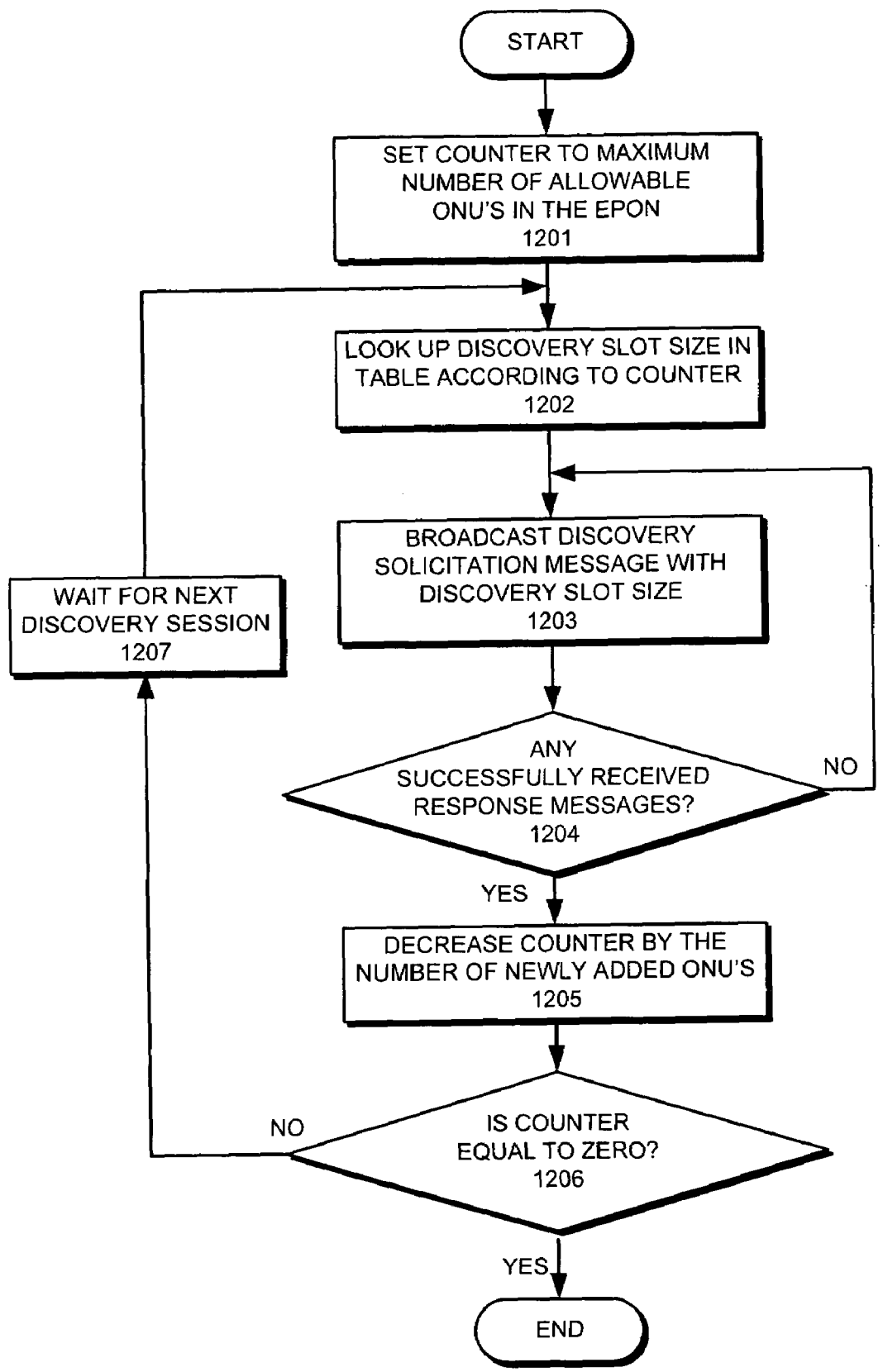
FIG. 12 presents a flow chart illustrating a discovery process wherein an OLT looks up the discovery slot size from a table according to the maximum number of undiscovered ONUs that may transmit response messages in accordance with an embodiment of the present invention.

FIG. 12 presents a flow chart illustrating a discovery process wherein an OLT looks up the discovery slot size from a table according to the maximum number of undiscovered ONUs that may transmit response messages in accordance with an embodiment of the present invention. At the outset, system starts by setting a counter to the maximum number of allowable ONUs in the EPON (since no ONU has registered yet), wherein the counter holds the maximum number of undiscovered ONUs that may transmit response messages (step 1201).

The system then looks up a discovery slot size stored in a table according to the value stored in the counter (step 1202). Subsequently, the system broadcasts a discovery solicitation message which includes the discovery slot size (step 1203). If the system does not receive successfully any response messages during the subsequent discovery window (step 1204), it waits for a period of time and broadcasts again a discovery solicitation message for the next discovery window. If the system receives successfully one or more response messages, it decreases the value in the counter by the number of successful registrations (step 1205). If the counter does not reach zero (step 1206), it means that the EPON has not reached its full capacity in terms of allowable ONUs, and the system will first wait for the next discovery session (step 1207), then go back to step 1202 and look up a new optimized discovery slot size. If the counter reaches zero, it means that the EPON has reached its full capacity for ONUs, and the system will end the discovery process and enter normal operation mode.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

TABLE 1

| # of ONUs | Slot Length (TQ) | Slot Length (bytes) |
|---|---|---|
| 2 | 2392 | 4784 |
| 3 | 3420 | 6840 |
| 4 | 4255 | 8510 |
| 5 | 4990 | 9980 |
| 6 | 5662 | 11324 |
| 7 | 6290 | 12580 |
| 8 | 6885 | 13770 |
| 9 | 7454 | 14908 |
| 10 | 8002 | 16004 |
| 11 | 8532 | 17064 |
| 12 | 9047 | 18094 |
| 13 | 9550 | 19100 |
| 14 | 10042 | 20084 |
| 15 | 10524 | 21048 |
| 16 | 10998 | 21996 |
| 17 | 11464 | 22928 |
| 18 | 11923 | 23846 |
| 19 | 12376 | 24752 |
| 20 | 12823 | 25646 |
| 21 | 13265 | 26530 |
| 22 | 13702 | 27404 |
| 23 | 14135 | 28270 |
| 24 | 14564 | 29128 |
| 25 | 14989 | 29978 |
| 26 | 15410 | 30820 |
| 27 | 15828 | 31656 |
| 28 | 16244 | 32488 |
| 29 | 16656 | 33312 |
| 30 | 17066 | 34132 |
| 31 | 17473 | 34946 |
| 32 | 17878 | 35756 |

What is claimed is:

1. A method for discovering remote nodes in an Ethernet passive optical network which includes a central node and at least one remote node, wherein downstream data from the central node is broadcast to the remote nodes, and wherein upstream data from each remote node is transmitted to the central node in a unicast manner, the method comprising:

receiving a solicitation message from the central node, wherein the solicitation message includes a time stamp indicating the solicitation message's transmission time and assigns a starting time and size for a discovery slot in which the remote node is allowed to transmit a response message to the central node for registration;

setting a local time at the remote node according to the received time stamp; and after a random delay from the beginning of the discovery slot, transmitting the response message to the central node during the discovery slot with a response transmission probability that is less than or equal to one.

2. The method of claim 1, further comprising setting the value of the response transmission probability according to how many times the remote node has failed in registering with the central node.

3. The method of claim 2, wherein the value of the response transmission probability is $C_f^{-(j-1)}$, where j is the number of previously failed registration attempts by the remote node; and $C_f$ is a positive number greater than 1.

4. The method of claim 1, wherein the central node sets the value of the response transmission probability and specifies the response transmission probability within the solicitation message.

5. The method of claim 4, further comprising setting the value of the response transmission probability according to the maximum number of undiscovered remote nodes that may transmit response messages for registration with the central node;
wherein the maximum number of undiscovered remote nodes that may transmit response messages decreases as the number of discovered remote nodes increases in an EPON with fixed maximum number of allowable remote nodes.

6. The method of claim 1, further comprising
setting the size of the discovery slot according to the maximum number of undiscovered remote nodes that may transmit response messages for registration with the central node;
wherein the maximum number of undiscovered remote nodes that may transmit response messages decreases as the number of discovered remote nodes increases in an EPON with fixed maximum number of allowable remote nodes.

7. The method of claim 6, wherein the size of the discovery slot is proportional to the maximum number of undiscovered remote nodes that may transmit response messages, and is also proportional to transmission busy time of the response message.

8. The method of claim 7, wherein the size of the discovery slot is precisely or approximately equal to $C_s \times n \times T$, where
$C_s$ is a positive number;
n is the maximum number of undiscovered remote nodes that may transmit response messages; and
T is the transmission busy time of the response message.

9. The method of claim 8, further comprising
storing values of the size of the discovery slot in a table based on different maximum numbers of undiscovered remote nodes that may transmit response messages; and
before sending out the solicitation message, retrieving a value of the size of the discovery slot based on the current maximum number of undiscovered remote nodes that may transmit response messages.

10. The method of claim 6, wherein size of the discovery slot is approximately:

$$\frac{T \cdot (2n-1) + \sqrt{T^2 \cdot (2n-1)^2 + 8 \cdot T \cdot E \cdot (n-1)}}{2};$$

where
T is the transmission busy time of the response message;
n is the maximum number of undiscovered remote nodes that may transmit response messages; and
E is the maximum round-trip propagation delay between the central node and any remote node.

11. The method of claim 10, further comprising
storing values of the size of the discovery slot in a table based on different maximum numbers of undiscovered remote nodes that may transmit response messages; and
before sending out the solicitation message, retrieving value of the size of the discovery slot based on the current maximum number of undiscovered remote nodes that may transmit response messages.

12. The method of claim 6, wherein size of the discovery slot is approximately:

$$n \cdot T + \sqrt{n^2 \cdot T^2 + 2 \cdot T \cdot E \cdot (n-1)};$$

where
T is the transmission busy time of the response message;
n is the maximum number of undiscovered remote nodes that may transmit response messages; and
E is the maximum round-trip propagation delay between the central node and any remote node.

13. The method of claim 12, further comprising
storing values of the size of the discovery slot in a table based on different maximum numbers of undiscovered remote nodes that may transmit response messages; and
before sending out the solicitation message, retrieving value of the size of the response transmission period based on the current maximum number of undiscovered remote nodes that may transmit response messages.

14. An apparatus for discovering remote nodes in an Ethernet passive optical network, comprising:
a central node;
at least one remote node that is configured to,
receive a solicitation message from the central node, wherein the solicitation message includes a time stamp indicating the solicitation message's transmission time and assigns a starting time and size for a discovery slot in which the remote node is allowed to transmit a response message to the central node for registration;
set a local time at the remote node according to the received time stamp; and
after a random delay from the beginning of the discovery slot, transmit the response message to the central node during the discovery slot with a response transmission probability that is less than or equal to one;
wherein downstream data from the central node is broadcast to the remote nodes, and wherein upstream data from each remote node is transmitted to the central node in a unicast manner.

15. The apparatus of claim 14, wherein the remote node is further configured to set the value of the response transmission probability according to how many times the remote node has failed in registering with the central node.

16. The apparatus of claim 15, wherein the value of the response transmission probability is $C_f^{-(j-1)}$, where
j is the number of previously failed registration attempts by the remote node; and
$C_f$ is a positive number greater than 1.

17. The apparatus of claim 14, wherein the central node is configured to set the value of the response transmission probability and specifies the response transmission probability within the solicitation message.

18. The apparatus of claim 17, wherein the central node is further configured to,
set the value of the response transmission probability according to the maximum number of undiscovered remote nodes that may transmit response messages for registration with the central node;
wherein the maximum number of undiscovered remote nodes that may transmit response messages decreases as the number of discovered remote nodes increases in an EPON with fixed maximum number of allowable remote nodes.

19. The apparatus of claim 14, wherein the central node is configured to,
set the size of the discovery slot according to the maximum number of undiscovered remote nodes that may transmit response messages for registration with the central node;
wherein the maximum number of undiscovered remote nodes that may transmit response messages decreases as the number of discovered remote nodes increases in an EPON with fixed maximum number of allowable remote nodes.

20. The apparatus of claim 19, wherein the size of the discovery slot is proportional to the maximum number of undiscovered remote nodes that may transmit response messages, and is also proportional to transmission busy time of the response message.

21. The apparatus of claim 20, wherein the size of the discovery slot is precisely or approximately equal to $C_s \times n \times T$, where
$C_s$ is a positive number;
n is the maximum number of undiscovered remote nodes that may transmit response messages; and
T is the transmission busy time of the response message.

22. The apparatus of claim 21, wherein the central node is further configured to,
store values of the size of the discovery slot in a table based on different maximum numbers of undiscovered remote nodes that may transmit response messages; and
before sending out the solicitation message, retrieve a value of the size of the discovery slot based on the current maximum number of undiscovered remote nodes that may transmit response messages.

23. The apparatus of claim 19, wherein size of the discovery slot is approximately:

$$\frac{T \cdot (2n-1) + \sqrt{T^2 \cdot (2n-1)^2 + 8 \cdot T \cdot E \cdot (n-1)}}{2};$$

where
T is the transmission busy time of the response message;
n is the maximum number of undiscovered remote nodes that may transmit response messages; and
E is the maximum round-trip propagation delay between the central node and any remote node.

24. The apparatus of claim 23, wherein the central node is further configured to,
store values of the size of the discovery slot in a table with regard to different maximum numbers of undiscovered remote nodes that may transmit response messages; and
before sending out the solicitation message, retrieve value of the size of the discovery slot based on the current maximum number of undiscovered remote nodes that may transmit response messages.

25. The apparatus of claim 19, wherein size of the discovery slot is approximately:

$$n \cdot T + \sqrt{n^2 \cdot T^2 + 2 \cdot T \cdot E \cdot (n-1)};$$

where
T is the transmission busy time of the response message;
n is the maximum number of undiscovered remote nodes that may transmit response messages; and
E is the maximum round-trip propagation delay between the central node and any remote node.

26. The apparatus of claim 25, wherein the central node is further configured to
store values of the size of the discovery slot in a table based on different maximum numbers of undiscovered remote nodes that may transmit response messages; and
before sending out the solicitation message, retrieve value of the size of the response transmission period based on the current maximum number of undiscovered remote nodes that may transmit response messages.

27. A computer-readable storage medium storing instructions that when executed by a computer cause the computer to perform a method for discovering remote nodes in an Ethernet passive optical network which includes a central node and at least one remote node, wherein downstream data from the central node is broadcast to the remote nodes, and wherein upstream data from each remote node is transmitted to the central node in a unicast manner, the method comprising:
receiving a solicitation message from the central node, wherein the solicitation message includes a time stamp indicating the solicitation message's transmission time and assigns a staffing time and size for a discovery slot in which the remote node is allowed to transmit a response message to the central node for registration;
setting a local time at the remote node according to the received time stamp; and
after a random delay from the beginning of the discovery slot, transmitting the response message to the central node during the discovery slot with a response transmission probability that is less than or equal to one.

28. The computer-readable storage medium of claim 27, wherein the method further comprises setting the value of the response transmission probability according to how many times the remote node has failed in registering with the central node.

29. The computer-readable storage medium of claim 28, wherein the value of the response transmission probability is $C_f^{-(j-1)}$, where
j is the number previously failed registration attempts by the remote node; and
$C_f$ is a positive number greater than 1.

30. The computer-readable storage medium of claim 27, wherein the central node sets the value of the response transmission probability and specifies the response transmission probability within the solicitation message.

31. The computer-readable storage medium of claim 30, wherein the method further comprises
setting the value of the response transmission probability according to the maximum number of undiscovered remote nodes that may transmit response messages for registration with the central node;
wherein the maximum number of undiscovered remote nodes that may transmit response messages decreases as the number of discovered remote nodes increases in an EPON with fixed maximum number of allowable remote nodes.

32. The computer-readable storage medium of claim 27, wherein the method further comprises
setting the size of the discovery slot according to the maximum number of undiscovered remote nodes that may transmit response messages for registration with the central node;
wherein the maximum number of undiscovered remote nodes that may transmit response messages decreases as the number of discovered remote nodes increases in an EPON with fixed maximum number of allowable remote nodes.

33. The computer-readable storage medium of claim 32, wherein the size of the discovery slot is proportional to the maximum number of undiscovered remote nodes that may transmit response messages, and is also proportional to transmission busy time of the response message.

34. The computer-readable storage medium of claim 33, wherein the size of the discovery slot is precisely or approximately equal to $C_s \times n \times T$, where $C_s$ is a positive number;

n is the maximum number of undiscovered remote nodes that may transmit response messages; and T is the transmission busy time of the response message.

35. The computer-readable storage medium of claim 34, wherein the method further comprises storing values of the size of the discovery slot in a table based on different maximum numbers of undiscovered remote nodes that may transmit response messages; and before sending out the solicitation message, retrieving a value of the size of the discovery slot based on the current maximum number of undiscovered remote nodes that may transmit response messages.

36. The computer-readable storage medium of claim 32, wherein size of the discovery slot is approximately:

$$\frac{T \cdot (2n-1) + \sqrt{T^2 \cdot (2n-1)^2 + 8 \cdot T \cdot E \cdot (n-1)}}{2};$$

where

T is the transmission busy time of the response message;

n is the maximum number of undiscovered remote nodes that may transmit response messages; and E is the maximum round-trip propagation delay between the central node and any remote node.

37. The computer-readable storage medium of claim 36, wherein the method further comprises storing values of the size of the discovery slot in a table based on different maximum numbers of undiscovered remote nodes that may transmit response messages; and before sending out the solicitation message, retrieving value of the size of the discovery slot based on the current maximum number of undiscovered remote nodes that may transmit response messages.

38. The computer-readable storage medium of claim 32, wherein size of the discovery slot is approximately:

$$n \cdot T + \sqrt{n^2 \cdot T^2 + 2 \cdot T \cdot E \cdot (n-1)};$$

where

T is the transmission busy time of the response message;

n is the maximum number of undiscovered remote nodes that may transmit response messages; and E is the maximum round-trip propagation delay between the central node and any remote node.

39. The computer-readable storage medium of claim 38, wherein the method further comprises storing values of the size of the discovery slot in a table based on different maximum numbers of undiscovered remote nodes that may transmit response messages; and before sending out the solicitation message, retrieving value of the size of the response transmission period based on the current maximum number of undiscovered remote nodes that may transmit response messages.

* * * * *